(12) United States Patent
Kim et al.

(10) Patent No.: US 8,802,013 B2
(45) Date of Patent: Aug. 12, 2014

(54) PREFABRICATED VOL-OXIDIZER FOR SPENT NUCLEAR FUEL FOR CONVENIENT OPERATION AND MAINTENANCE

(75) Inventors: Young Hwan Kim, Daejeon (KR); Geun Il Park, Daejeon (KR); Jae Hoo Jung, Daejeon (KR); Jung Won Lee, Daejeon (KR); Ki Ho Kim, Daejeon (KR); Young Soon Lee, Daejeon (KR); Do Youn Lee, Daejeon (KR)

(73) Assignees: Korea Atomic Energy Research Institute, Daejeon (KR); Korea Hydro & Nuclear Power Co., Ltd., Seoul (KR)

( * ) Notice: Subject to any disclaimer, the term of this patent is extended or adjusted under 35 U.S.C. 154(b) by 640 days.

(21) Appl. No.: 13/105,010

(22) Filed: May 11, 2011

(65) Prior Publication Data

US 2012/0051978 A1 Mar. 1, 2012

(30) Foreign Application Priority Data

Sep. 1, 2010 (KR) .................. 10-2010-0085730

(51) Int. Cl.
*G21C 1/01* (2006.01)

(52) U.S. Cl.
USPC ........................................... 422/159

(58) Field of Classification Search
CPC ......................................... G21C 1/00
USPC ........................................... 422/159
See application file for complete search history.

(56) References Cited

U.S. PATENT DOCUMENTS

| 4,343,478 | A | * | 8/1982 | Morgan et al. | ................. 277/385 |
| 6,940,939 | B1 | * | 9/2005 | Ichikawa et al. | ............. 376/305 |
| 7,504,079 | B2 | * | 3/2009 | Kim et al. | ..................... 422/159 |

FOREIGN PATENT DOCUMENTS

| JP | 2003-098290 | 4/2003 |
| JP | 2007-139746 | 6/2007 |

OTHER PUBLICATIONS

"Development on High-Throughput Integrated Vol-Oxidizer Decladding and Vol-Oxidizing Considering Remote Operability," Korean Radioactive Waste Society, (May 13-14, 2010).
Young-Hwan Kim, et al., "Development of a Modular Vol-Oxidizer Using Design Process," The 9th Joint Workshop between China and Korea on Nuclear Waste Management and Nuclear Fuel Cycle, (Jun. 22-25, 2010).

* cited by examiner

Primary Examiner — Walter D Griffin
Assistant Examiner — Huy-Tram Nguyen
(74) Attorney, Agent, or Firm — Hammer & Associates, P.C.

(57) ABSTRACT

A vol-oxidizer for spent nuclear fuel is provided. The vol-oxidizer includes a reactor module in which the spent nuclear fuel is put and oxidized; a heating module to heat the reactor module to a high temperature; a utility module to control an inner state of the reactor module, being connected with the reactor module; a support module to support the heating module and the reactor module; a drive module to supply a driving force for transferring the spent nuclear fuel within the reactor module; a valve module to control discharge of the spent nuclear fuel being oxidized in the reactor module; and a collecting container module to collect the spent nuclear fuel being oxidized and discharged from the reactor module. The respective modules are assembled and disassembled with respect to one another.

11 Claims, 13 Drawing Sheets

PREFABRICATED VOL-OXIDIZER FOR SPENT NUCLEAR FUEL FOR CONVENIENT OPERATION AND MAINTENANCE

CROSS-REFERENCE TO RELATED APPLICATION

This application claims the benefit of Korean Patent Application No. 10-2010-0085730, filed on Sep. 1, 2010, in the Korean Intellectual Property Office, the disclosure of which is incorporated herein by reference.

BACKGROUND

1. Field of the Invention

The present invention relates to a prefabricated vol-oxidizer for spent nuclear fuel, enabling convenient operation and maintenance thereof.

2. Description of the Related Art

Nuclear fuel is a substance capable of extracting a usable energy by continuously causing nuclear fission by being fed in a nuclear reactor. Spent nuclear fuel refers to a used substance remaining after the nuclear fission.

Such spent nuclear fuel may be managed generally by two methods. One method is to thoroughly isolate the spent nuclear fuel from the human ecosystem by burying the spent nuclear fuel in a rock bed lying at about 500 m or more underground, which is called permanent disposal. The other method is to reuse the nuclear fuel by extracting a recyclable substance from the spent nuclear fuel while permanently disposing of high-level radioactive substances.

According to those conventional methods, a spent nuclear fuel assembly combusted in a nuclear power plant is no longer processed and stored in a water reservoir. However, as a driving time of the nuclear power plant increases, quantity of used nuclear fuel rods gradually increases, consequently requiring a great storage space. Furthermore, risk and necessity for proper disposal of the accumulated nuclear waste are continuously raised as issues.

Accordingly, there is a desire for a new scheme and method for managing and recycling spent nuclear fuel in a solid state. In this regard, an apparatus for partial processing that pulverizes and oxidizes the spent nuclear fuel for a following process has been developed.

SUMMARY

An aspect of the present invention provides a vol-oxidizer for spent nuclear fuel, capable of pulverizing rod-cuts using air and heat and enabling convenient maintenance and repair by a modularized structure.

Another aspect of the present invention provides a vol-oxidizer for spent nuclear fuel, enabling convenient operation, maintenance, and repair in a remote manner from a highly-radioactive hot cell.

According to an aspect of the present invention, there is provided a vol-oxidizer for spent nuclear fuel including a reactor module in which the spent nuclear fuel is placed and oxidized, a heating module to heat the reactor module to high temperature, a utility module to control an inner state of the reactor module, being connected with the reactor module, a support module to support the heating module and the reactor module, a drive module to supply a driving force for transferring the spent nuclear fuel within the reactor module, a valve module to control discharge of the spent nuclear fuel being oxidized in the reactor module, and a collecting container module to collect the spent nuclear fuel being oxidized and discharged from the reactor module, wherein the respective modules may be assembled and disassembled with respect to one another.

EFFECT

According to embodiments of the present invention, separation and connection of a vol-oxidizer for spent nuclear fuel may be conveniently performed in a remote manner.

Additionally, according to embodiments of the present invention, maintenance and repair of the vol-oxidizer for spent nuclear fuel are facilitated.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Therefore, the description about a certain drawing may be made with reference to the other drawings. Features generally known in the art or repeatedly explained throughout will be omitted.

Figure 1:
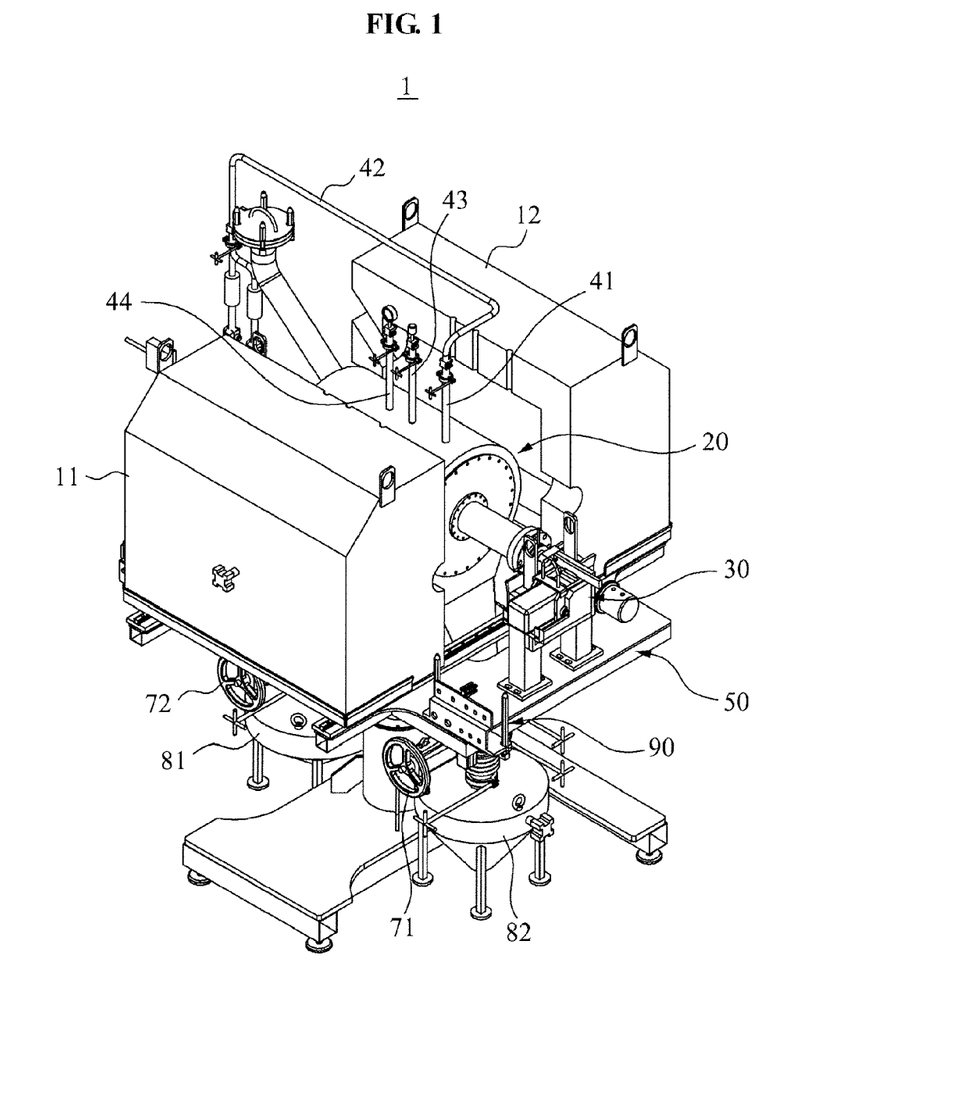
FIG. 1 is a perspective view illustrating a vol-oxidizer for spent nuclear fuel according to an embodiment of the present invention.
Figure 2:
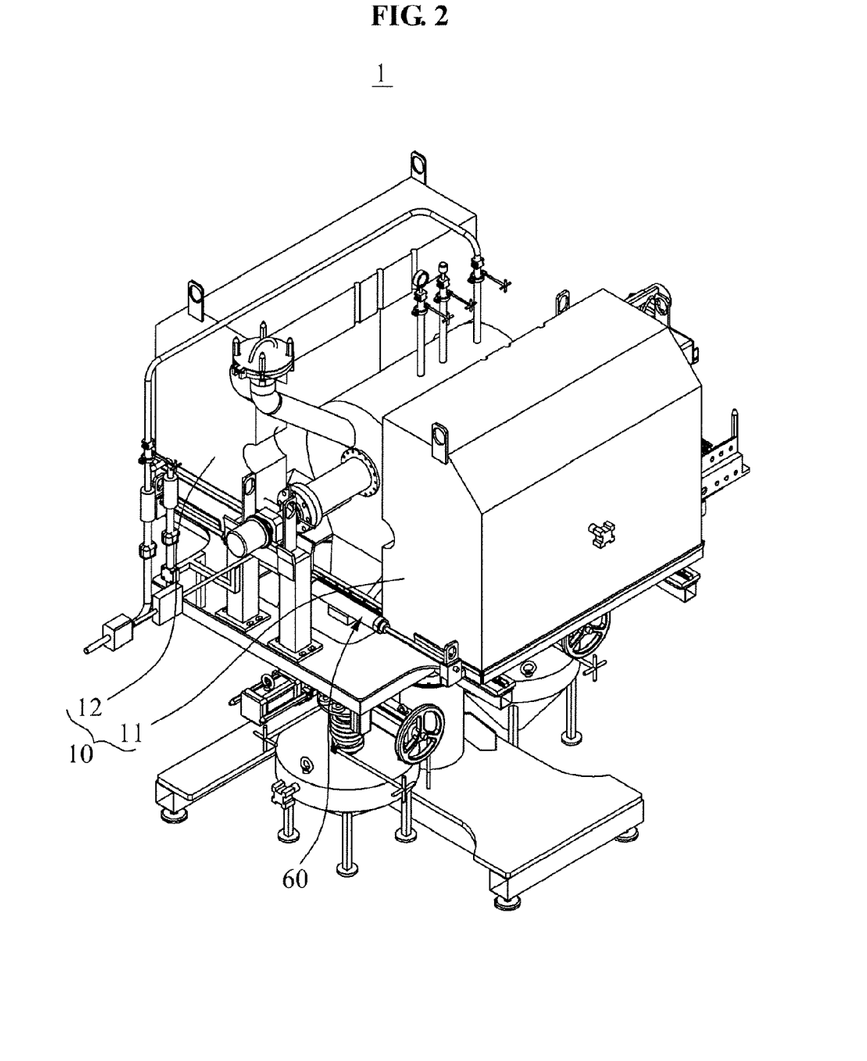
FIG. 2 is another perspective view illustrating the vol-oxidizer for spent nuclear fuel of FIG. 1.

FIG. 1 is a perspective view illustrating a vol-oxidizer 1 for spent nuclear fuel according to an embodiment of the present invention. FIG. 2 is another perspective view of the spent nuclear fuel vol-oxidizer 1 of FIG. 1.

Referring to FIGS. 1 and 2, the spent nuclear fuel vol-oxidizer 1 includes a heating module 10, a reactor module 20, a drive module 30, a utility module 40, a support module 50, an air cylinder module 60, a valve module 70, a collecting container module 80, a terminal block module 90, and a guide module 95.

The spent nuclear fuel vol-oxidizer 1 may oxidize spent nuclear fuel by heating the spent nuclear fuel to a high temperature under vacuum.

The heating module 10 supplies heat for oxidizing the spent nuclear fuel. The spent nuclear fuel may be put in the reactor module 20, where the reactor module 20 then oxidizes the spent nuclear fuel. The drive module 30 may supply a driving force for transferring the spent nuclear fuel within the reactor module 20. The support module 50 may support the heating module 10, the reactor module 20, and the drive module 30. The valve module 70 controls discharge of the spent nuclear fuel oxidized by the reactor module 20. The collecting container module 80 may collect the spent nuclear fuel being oxidized and discharged from the reactor module 20. The guide module 95 may guide movement of the heating module 10.

The spent nuclear fuel vol-oxidizer 1 is prefabricated. That is, the spent nuclear fuel vol-oxidizer 1 may be connected and separated in units of the respective modules. Possibility of remote connection and separation of the modules may be analyzed in view of visibility, interference, approach, weight, and the like.

The heating module 10, the utility module 40, the drive module 30, the valve module 70, and the collecting container module 80 may be made of SUS304 and ceramic.

Figure 3A:
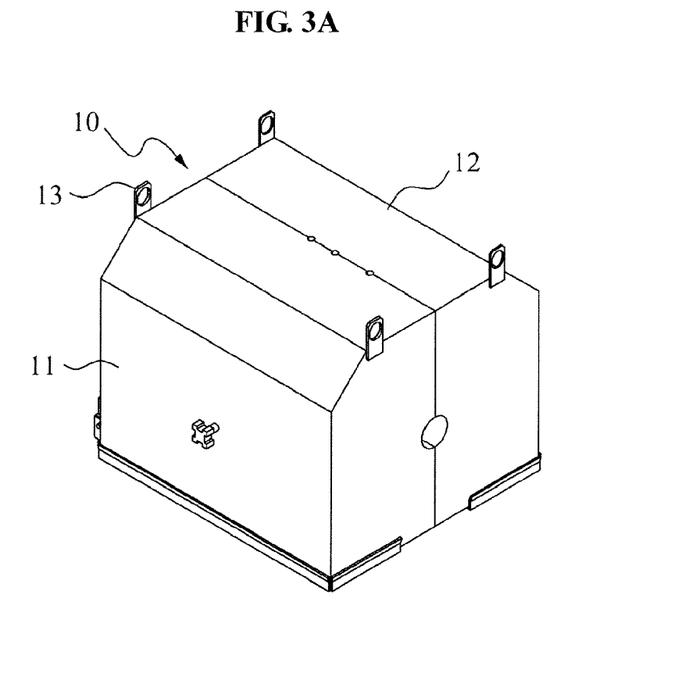
FIGS. 3A and 3B are a perspective view and a front view of a heating module of the vol-oxidizer for spent nuclear fuel of FIG. 1.
Figure 3B:
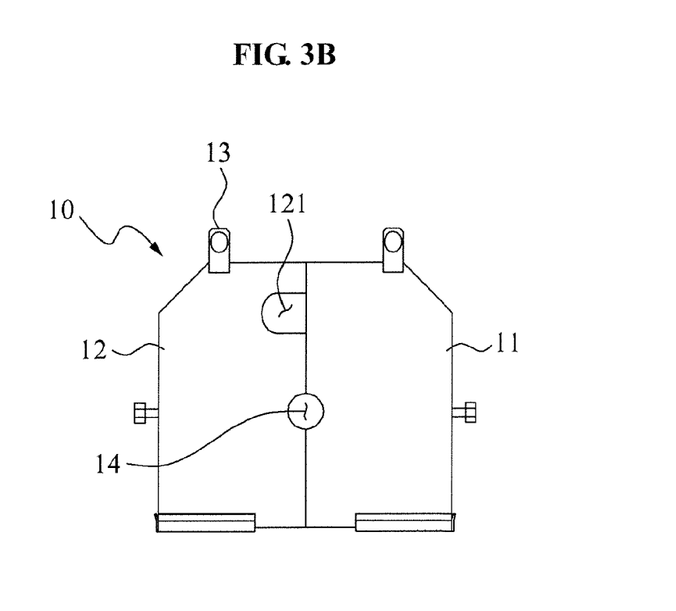

FIG. 3A is a perspective view of the heating module 10 of the spent nuclear fuel vol-oxidizer 1. FIG. 3B is a front view of the heating module 10.

Referring to FIGS. 1 through 3B, the heating module 10 may heat the reactor module 20 to a high temperature so as to oxidize the spent nuclear fuel. More specifically, the heating module 10 may heat an oxidation container provided in the reactor module 20 up to approximately 500 Celsius degrees or more to oxidize the spent nuclear fuel. For this purpose, according to an exemplary embodiment, the heating module 10 may be made of a material having a low thermal expansion coefficient so as not to change much in shape, even at the high temperature.

The heating module 10 may include a first heating body 11 and a second heating body 12. The first heating body 11 may form a left half portion of the heating module 10 while the second heating body 12 forms a right half portion. The first heating body 11 and the second heating body 12 may be symmetrically disposed on the left and the right with respect to a vertical bisector of the heating module 10.

The first heating body 11 and the second heating body 12 may be connected at both sides with respect to the reactor module 20 disposed therebetween. A space portion for receiving the reactor module 20 is depressed inside the first heating body 11 and the second heating body 12. According to this structure, the heating module 10 surrounds the reactor module 20. Additionally, a heating member H such as an electric heating wire may be provided on inner surfaces of the first heating body 11 and the second heating body 12.

The heating module 10 may further include an introduction unit hole 121 fit around an introduction unit 22 of the reactor module 20, and a rotation shaft hole 14 fit around a rotation shaft 35 of the drive module 30.

The first heating body 11 and the second heating body 12 may be mounted on the support module 50 in a sliding manner. The first heating body 11 and the second heating body 12 may linearly slide on the support module 50. For example, the first heating body 11 and the second heating body 12 may slide in lateral directions.

Pulling tension may be applied to the first heating body 11 and the second heating body 12 in the lateral directions, for separation of the heating module 10.

Movements of the first heating body 11 and the second heating body 12 may be guided by the guide module 95.

A handling tool connector 13 may be provided to an upper end of the heating module 10 for connection with a handling tool such as a hook or a crane. The handling tool connector 13 may facilitate remote connection and separation of the heating module 10. The handling tool connector 13 may include a hole to efficiently connect the handling tool.

Hereinafter, processes of remotely connecting and separating the heating module 10 will be described.

First, to separate the heating module 10 from the support module 50, the first heating body 11 is pulled to the left and the second heating body 12 is pulled to the right so that the first heating body 11 and the second heating body 12 are separated from each other.

The first heating body 11 and the second heating body 12 are slid on the support module 50 in the opposite directions and separated by a predetermined interval from each other.

Next, the handling tool such as a hook or a crane is connected to the handling tool connector 13 disposed at upper ends of the first heating body 11 and the second heating body 12. The handling tool lifts the first heating body 11 and the second heating body 12 from the support module 50.

On the other hand, to remotely connect the heating module 10 to the support module 50, the handling tool such as a hook or a crane is connected to the handling tool connector 13 of the first heating body 11 and the second heating body 12. The first heating body 11 and the second heating body 12 are mounted on the support module 50. More specifically, the first heating body 11 and the second heating body 12 may be mounted on the guide module 95.

After the first heating body 11 and the second heating body 12 are mounted on the guide module 95, a pushing force is applied to the first heating body 11 and the second heating body 12 in a direction toward the reactor module 20 disposed between the first heating body 11 and the second heating body 12, thereby connecting the first heating body 11 and the second heating body 12 to each other.

Since the first heating body 11 and the second heating body 12 are connected with the reactor module 20 disposed therebetween, the support module 50 is surrounded by the first heating body 11 and the second heating body 12.

Figure 4:
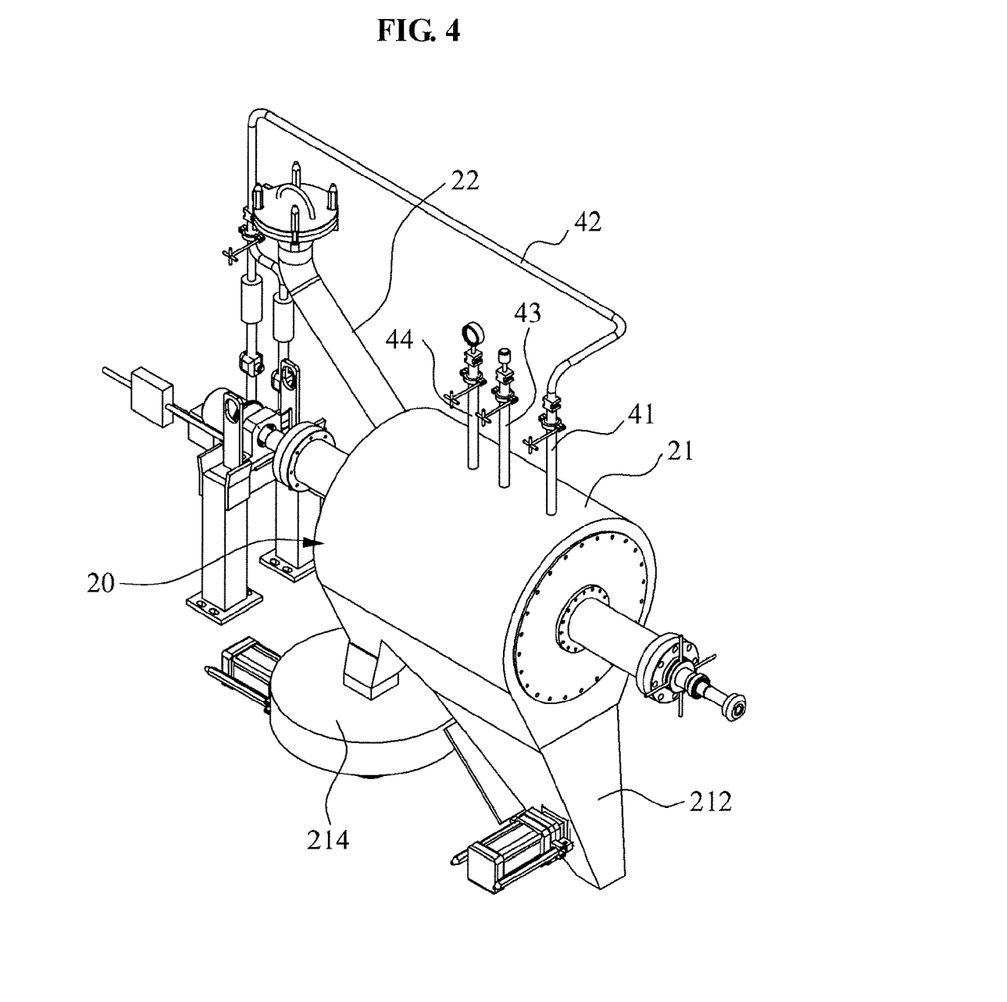
FIG. 4 is a perspective view of a reactor module of the vol-oxidizer for spent nuclear fuel of FIG. 1.

FIG. 4 is a perspective view of the reactor module 20 of the spent nuclear fuel vol-oxidizer 1 of FIG. 1.

Referring to FIGS. 1, 2, and 4, the reactor module 20 may include a body unit 21 and the introduction unit 22.

The oxidation container adapted to receive the spent nuclear fuel may be mounted in the body unit 21. The oxidation container may have a hollow cylindrical shape. A circumferential surface of the oxidation container may be formed of mesh. Due to the mesh structure, the spent nuclear fuel before being oxidized may be disposed in the oxidation container.

However, when the spent nuclear fuel is separated into hulls and oxidation powders, the hulls remain in the oxidation container whereas the oxidation powders are passed through the mesh and collected by a powder receiver (not shown) disposed at a lower portion of the oxidation container.

The powder receiver may be rotatable by about 180 degrees from a lower side to an upper side of the oxidation container with respect to the rotation shaft 35. Accordingly, the oxidation powder collected in the powder receiver may be transferred to a powder transfer unit 212 that will be described hereinafter.

Additionally, the body unit 21 includes a powder transfer unit 212 and the hull transfer unit 214 disposed at a lower portion of the body unit 21.

The hull transfer unit 214 may transfer the hulls separated in the oxidation container to the collecting container module 80. Specifically, the hulls left in the oxidation container by the oxidation are transferred to the collecting container module 80 by the hull transfer unit 214.

The powder transfer unit 212 may transfer the oxidation powder separated from the oxidation container. To be more specific, when the oxidation powder are collected to the powder receiver after the oxidation, the powder receiver is rotated, thereby transferring the oxidation powder to the powder transfer unit 212. The oxidation powder transferred to the powder transfer unit 212 are then transferred to the collecting container module 80.

The powder transfer unit 212 may be sloped with respect to a horizontal plane by a predetermined angle, for example, by about 45 degrees.

The introduction unit 22 having a tubular shape may introduce the spent nuclear fuel into the oxidation container from the outside. One end of the introduction unit 22 protrudes out of the oxidation container.

Specifically, the introduction unit 22 may have a hollow cylindrical shape and supply a path for movement of the spent nuclear fuel from an outside of the body unit 21 up to the oxidation container.

The body unit 21 may be connected with a decompression unit 41, a degassing and decompression tube 42, an oxidizing agent supply unit (not shown), a pressure gauge 44, and a temperature sensor connector 43. A pressure gauge fastening clamp 441, a temperature sensor fastening clamp 421, and a decompression tube fastening clamp 411 may be further connected, which will be described in detail hereinafter.

Figure 5:
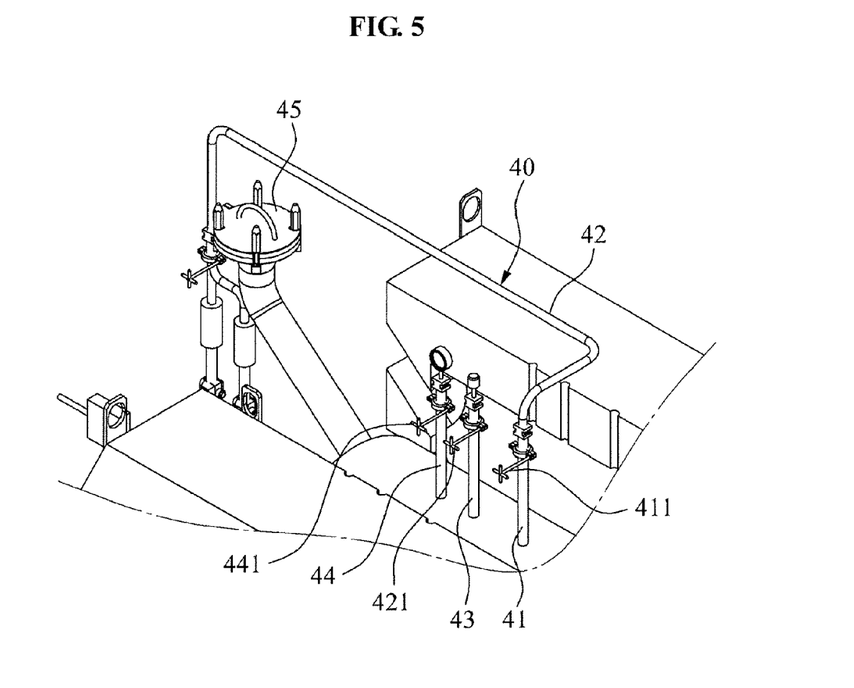
FIG. 5 is a perspective view of a utility module of the vol-oxidizer for spent nuclear fuel of FIG. 1.

FIG. 5 is a perspective view of the utility module 40 of the spent nuclear fuel vol-oxidizer 1 of FIG. 1.

Referring to FIGS. 1, 2, and 5, the utility module 40 may be connected to the reactor module 20 to control conditions of the reactor module 20. The utility module 40 may include the decompression unit 41, the degassing and decompression tube 42, the oxidizing agent supply unit (not shown), and an introduction unit cover 45.

The decompression unit 41 and the degassing and decompression tube 42 may enable the reactor module 20 to perform the high temperature oxidation in a decompressed state.

More specifically, the decompression unit 41 and the degassing and decompression tube 42 may be connected to a decompression pump (not shown) installed at an outside of the reactor module 20. The decompression pump may decompress the reactor module 20 to a vacuum state so that the high temperature oxidation is performed under vacuum.

One end of the decompression unit 41 is connected to an inside of the body unit 21 while the other end of the decompression unit 41 is protruded out of the body unit 21. The decompression unit 41 is connected with the body unit 21 and may pass through the body unit 21.

The decompression unit 41 may include a decompression valve (not shown) adapted to control an inner pressure of the body unit 21.

One end of the degassing and decompression tube 42 is connected to the decompression unit 41 and the other end is connected to the decompression pump (not shown) installed at an outside of the body unit 21. The degassing and decompression tube 42 may be bent at a position between the decompression unit 41 and the decompression pump.

The degassing and decompression tube 42 is connected to the body unit 21 and may pass through the body unit 21. Therefore, volatile gas such as Kr, I, tritium (H3), and the like generated from the spent nuclear fuel during the high-temperature oxidation may be removed by the degassing and decompression tube 42.

One end of the temperature sensor connector 43 may be connected to the inside of the body unit 21 whereas the other end is exposed to the outside of the body unit 21.

The degassing and decompression tube 42 may include a valve (not shown) adapted to selectively remove gases generated according to temperatures during the high-temperature oxidation.

The oxidizing agent supply unit (not shown) may supply a path for supply of an oxidizing agent into the oxidation container.

The pressure gauge 44 may be connected to the body unit 21 by passing through the body unit 21.

Generally, oxygen ($O_2$) is used as the oxidizing agent. The oxidizing agent supply unit (not shown) may be in a tube shape having a predetermined diameter so as to be able to supply $O_2$. The oxidizing agent supply unit (not shown) may include a valve to decompress an inside of the oxidation container to a vacuum state during the high-temperature heating.

The heating module 10 may include holes for the decompression unit 41, the degassing and decompression tube 42, and the pressure gauge 44 to pass through. The first heating body 11 and the second heating body 12 may include grooves having a curved cross section to form the holes.

Therefore, the first heating body 11 and the second heating body 12 are connected to each other with the decompression unit 41, the degassing and decompression tube 42, and the pressure gauge 44 disposed therebetween.

More specifically, the decompression unit 41, the degassing and decompression tube 42, and the pressure gauge 44 are mounted to the body unit 21 of the reactor module 20. Next, the first heating body 11 and the second heating body 12 are connected to each other with the degassing and decompression tube 42, the pressure gauge 44, and the reactor module 20 disposed therebetween.

The introduction unit cover 45 is connected to one end of the introduction unit 22 of the reactor module 20. The introduction unit cover 45 may selectively open and close one end of the introduction unit 22, thereby controlling entry of the spent nuclear fuel.

Figure 6:
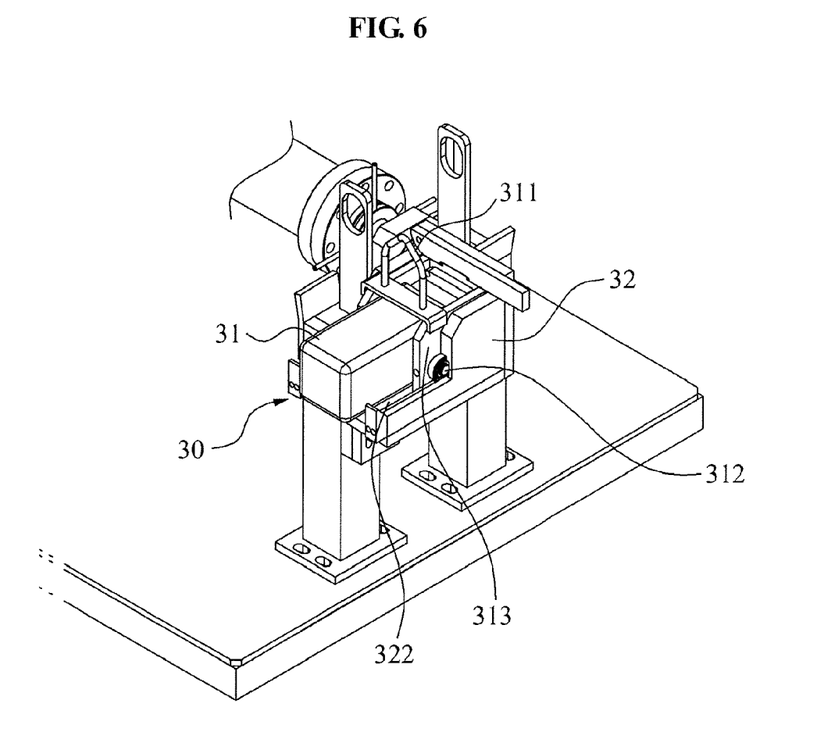
FIG. 6 is a perspective view of a drive module of the vol-oxidizer for spent nuclear fuel of FIG. 1.
Figure 7:
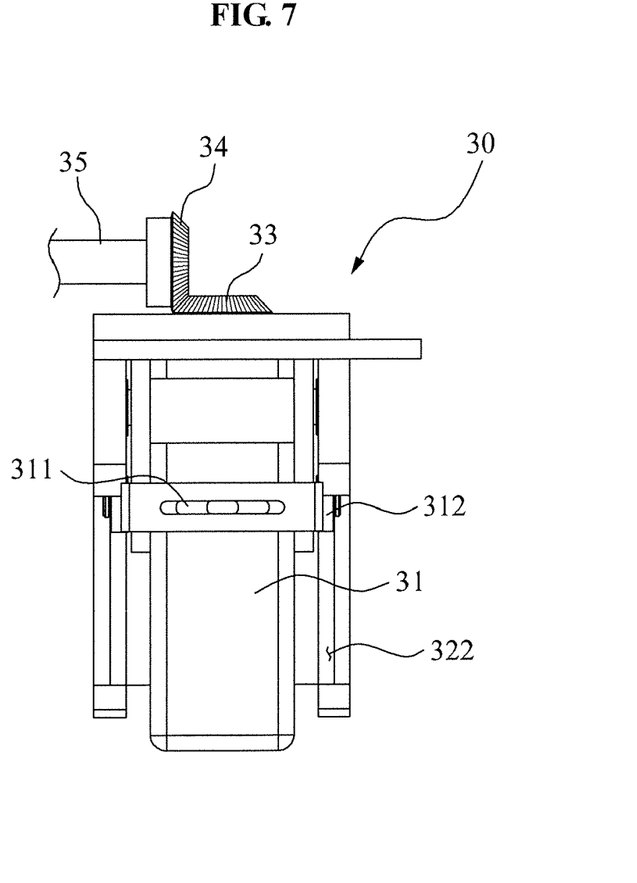
FIG. 7 is a plan view of the drive module of the vol-oxidizer for spent nuclear fuel of FIG. 1.
Figure 8:
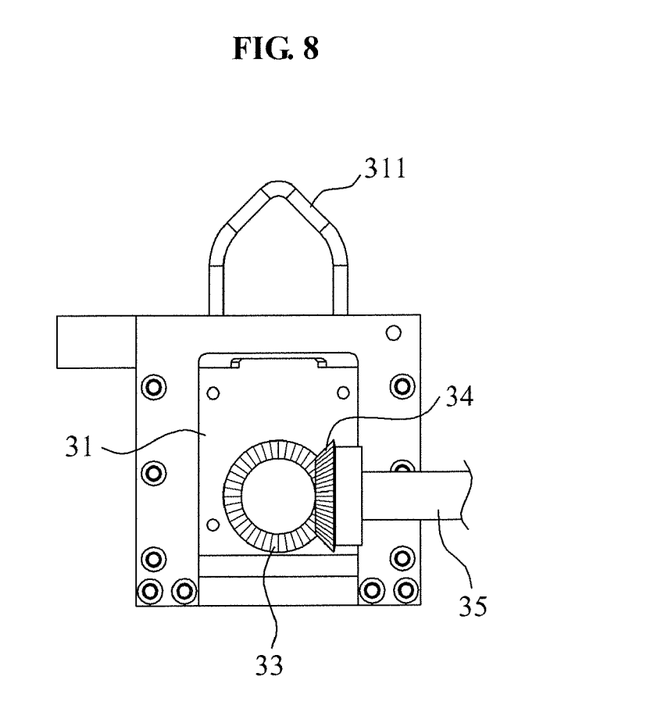
FIG. 8 is a front view of the drive module of the vol-oxidizer for spent nuclear fuel of FIG. 1.

FIG. 6 is a perspective view of the drive module 30 of the spent nuclear fuel spent nuclear fuel 1 of FIG. 1. FIG. 7 is a plan view of the drive module 30 of the spent nuclear fuel vol-oxidizer 1. FIG. 8 is a front view of the drive module 30 of the spent nuclear fuel vol-oxidizer 1.

Referring to FIGS. 1, 2, and 6 to 8, the drive module 30 may include a motor 31, a motor housing 32, power transmitters 33 and 34, the rotation shaft 35, and a transfer unit (not shown).

A driving shaft of the motor 31 may be coplanar with the rotation shaft 35 and also be arranged perpendicular to the rotation shaft 35.

A hook portion 311 may be provided at one side of the motor 31 to transfer the motor 31. When the handling tool such as a crane and a hook is fixed to the hook portion 311, the motor 31 may be lifted or transferred remotely.

The motor 31 is separably connected to the motor housing 32. The motor 31 includes a wheel unit 312 for sliding connection with the motor housing 32. The wheel unit 312 may be rotatably connected to a lower end of the motor 31.

The motor 31 may further include a stopper 313 to prevent the motor 31 from sliding by a predetermined distance away from the motor housing 32. The stopper 313 may be connected with a side surface or an upper surface of the motor 31 and protrude by a predetermined thickness from the motor 31.

When the motor 31 is moved by more than the predetermined distance with respect to the motor housing 32, the stopper 313 is interfered with a part of the motor housing 32. Accordingly, the motor 31 is prevented from further moving with respect to the motor housing 32 and being separated from the motor housing 32.

The motor housing 32 includes a space so that the motor 31 is received in the space. Additionally, the motor housing 32 includes a rail unit 322 for contact with the wheel unit 312. The rail unit 322 may be recessed to a predetermined depth to receive the wheel unit 312. The rail unit 322 may extend in a direction perpendicular to the rotation shaft 35. Accordingly, the driving shaft of the motor 31 may be perpendicular to the rotation shaft 35.

The motor housing 32 is connected to the support module 50, for example by a fastening member. The motor housing 32 may be connected to the support module 50 to slope down toward the rotation shaft 35. Accordingly, the rail unit 322 of the motor housing 32 is sloped down toward the rotation shaft 35.

Therefore, when the motor 31 is received in the motor housing 32, that is, when the wheel unit 312 is received in the rail unit 322, the motor 31 is slid toward the rotation shaft 35. The motor 31 is slid within the motor housing 32 until the stopper 313 is interfered with a part of the motor housing 32.

Exemplarily, when sliding of the motor 31 is stopped by the stopper 313, the power transmitter 33 in connection with the driving shaft of the motor 31 is then connected to the power transmitter 34 in connection with the rotation shaft 35.

Therefore, a connection portion between the motor 31 and the motor housing 32 may be configured to enable sliding of the motor 31, considering the connection structure between the power transmitters 33 and 34 and the slope structure at a surface receiving the motor 31. For example, the motor housing 32 may be sloped by about 5 degrees with respect to a horizontal plane.

Thus, since connection and separation of the motor 31 may be remotely performed using the handling tool such as a crane, maintenance and repair of the motor 31 are facilitated.

The driving force of the motor 31 may be transmitted to the rotation shaft 35 through the power transmitters 33 and 34. For example, bevel gears may be used as the power transmitters 33 and 34. In this case, the bevel gears may be disposed at an end of the driving shaft and an end of the rotation shaft 35.

The rotation shaft 35 is disposed to pass through the oxidation container, the body unit 21, and the heating module 10. The one end of the rotation shaft 35 may be transmitted with the driving force from the motor 31 through the power transmitters 33 and 34. The transfer unit may be mounted to the rotation shaft 35.

The transfer unit may be disposed in the oxidation container to transfer, into the oxidation container, the spent nuclear fuel supplied from the introduction unit 22. The transfer unit may have a screw shape and may be mounted to the rotation shaft 46 to be rotated integrally with the rotation shaft 35.

Figure 9A:
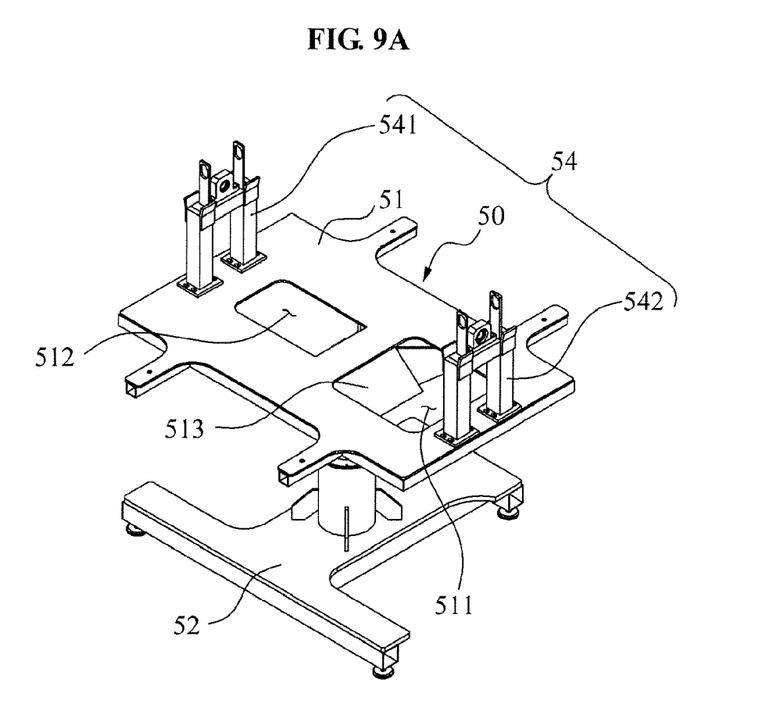
FIGS. 9A and 9B are a perspective view and a side view of a support module of the vol-oxidizer for spent nuclear fuel of FIG. 1.
Figure 9B:
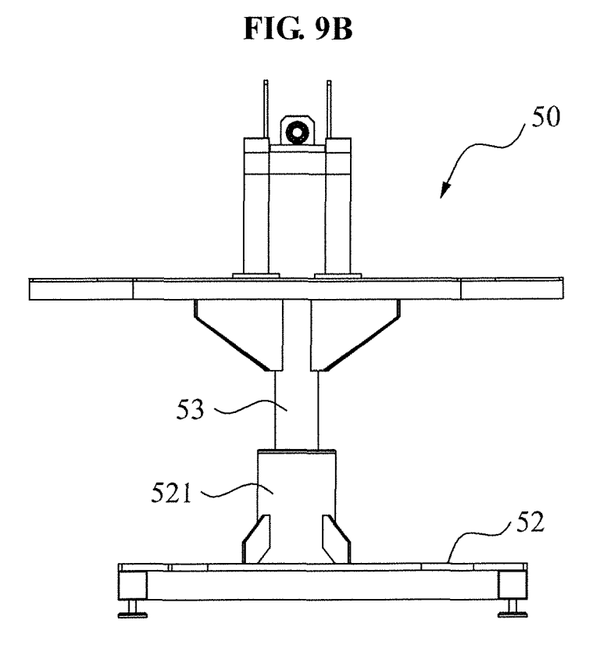

FIGS. 9A and 9B are a perspective view and a side view, respectively, of the support module 50 of the spent nuclear fuel vol-oxidizer 1 of FIG. 1.

Referring to FIGS. 9A and 9B, the support module 50 may include a support board 51, a base unit 52, a support shaft 53, and a supporter unit 54.

The support board 51 supports the heating module 10, the reactor module 20, and the drive module 30. The support board 51 may include a powder transfer unit hole 511 fit around the powder transfer unit 212, and a hull transfer unit hole 512 fit around the hull transfer unit 214.

A powder transfer unit supporter 513 may be provided at one side of the powder transfer unit hole 511 to support the powder transfer unit 212. The powder transfer unit supporter 513 may be sloped down by a predetermined angle from the support board 51. For example, the powder transfer unit supporter 513 may be sloped corresponding to a slope angle of the powder transfer unit 212.

The powder transfer unit supporter 513 may be formed by bending a part of the support board 51. Also, the powder transfer unit supporter 513 may have a thin plate shape.

The support board 51 may include supporters 541 and 542 rotatably supporting the rotation shaft 35. The supporters 541 and 542 may be protruded from the support board 51 by a predetermined length.

The supporters 541 and 542 may include a front supporter 541 to support a front end of the rotation shaft 35 and a rear supporter 542 to support a rear end of the rotation shaft 35. Bearings may be applied where the rotation shaft 35 is rotatably mounted to the supporters 541 and 542, for smoother rotation of the rotation shaft 35.

The support shaft 53 is disposed at a lower part of the support board 51 to support the support board 51. The support shaft 53 may be extended downward from the support board 51 and rotatably connected to the base unit 52. As a result, the heating module 10, the reactor module 20, and the drive module 30 may be conveniently maintained and repaired.

The base unit 52 forms a bottom surface of the support module 50. For this, the base unit 52 may have a wide plate shape capable of stably supporting the support module 50.

The base unit 52 may include a support shaft connector 521 rotatably connected to the support shaft 53. The support shaft connector 521 may extend upward from the base unit 52. A bearing may be provided to the support shaft connector 521 so that the support shaft 53 is rotatably connected. More specifically, the support shaft connector 521 may have a larger diameter than the support shaft 53 so that the support shaft 53 is inserted in the support shaft connector 521.

Figure 10:
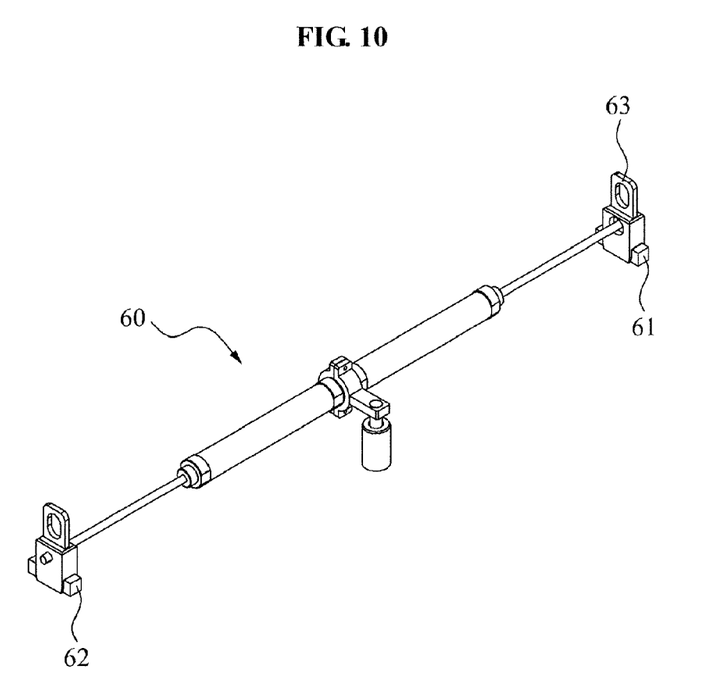
FIG. 10 is a perspective view of an air cylinder module of the vol-oxidizer for spent nuclear fuel of FIG. 1.

FIG. 10 is a perspective view of the air cylinder module 60 of the spent nuclear fuel vol-oxidizer 1.

Referring to FIGS. 1, 2, and 10, the air cylinder module 60 may be connected to one side of the heating module 10 to supply a force for separate and connect the heating module 10.

A first connector 61 for connection with the first heating body 11 may be provided to one end of the air cylinder module 60. A second connector 62 for connection with the second heating body 12 may be provided to the other end of the air cylinder module 60. The first connector 61 and the second connector 62 may be shaped as protrusions to be inserted in the first heating body 11 and the second heating body 12, respectively.

The air cylinder module 60 may separate the heating module 10 by pushing the first heating body 11 and the second body 12 in opposite outward directions using a pneumatic pressure. Also, the air cylinder module 60 may connect the heating module 10 by pulling the first heating body 11 and the second body 12 toward each other.

Figure 11:
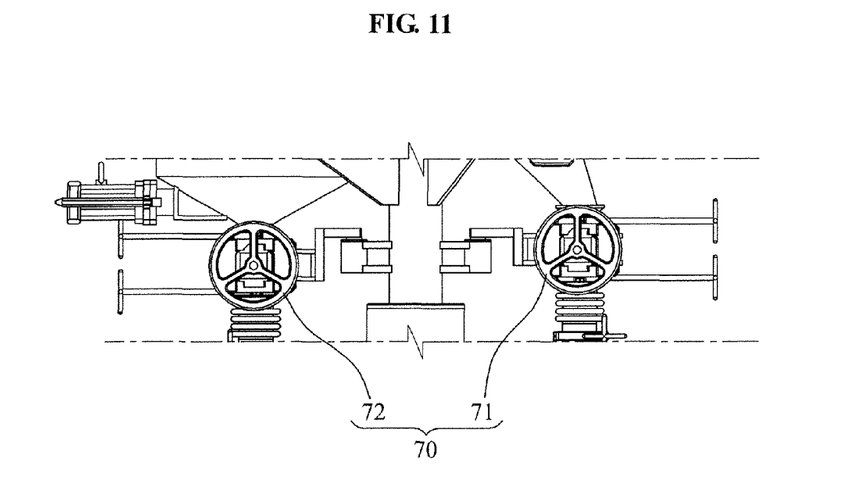
FIG. 11 is a front view of a valve module of the vol-oxidizer for spent nuclear fuel of FIG. 1.

FIG. 11 is a front view of the valve module 70 of the spent nuclear fuel vol-oxidizer 1.

Referring to FIGS. 1, 2, and 10, the valve module 70 may include a oxidation powder valve 71 to control discharge of the oxidation powder being transferred from the powder transfer unit 212, and a hull valve 72 to control discharge of the hulls being transferred from the hull transfer unit 214.

Knife gate valves may be used as the oxidation powder valve 71 and the hull valve 72. In general, the knife gate valve refers to a device opening and closing flow of fluid, being connected between a tube member and another tube member. In particular, when the fluid has a predetermined viscosity and accordingly has friction and stagnation, the knife gate valve may be effective to control the flow of fluid.

The oxidation powder valve 71 and the hull valve 72 may be connected and separated using clamps.

Figure 12:
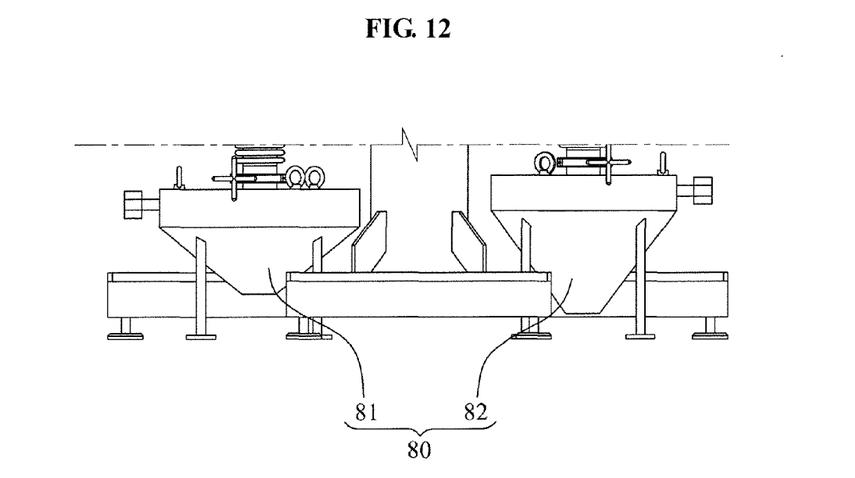
FIG. 12 is a front view of a collecting container module of the vol-oxidizer for spent nuclear fuel of FIG. 1.

FIG. 12 is a front view of the collecting container module of the spent nuclear fuel vol-oxidizer 1.

Referring to FIGS. 1, 2, and 12, the collecting container module 80 may include a hull collecting container 81 and a oxidation powder collecting container 82 to collect the oxidation powder.

The hull collecting container 81 and the oxidation powder collecting container 82 may be made of a flexible material or formed by welding.

In addition, an end cap, which is slidable back and forth, may be separably connected to the hull collecting container 81 and the oxidation powder collecting container 82.

Figure 13:
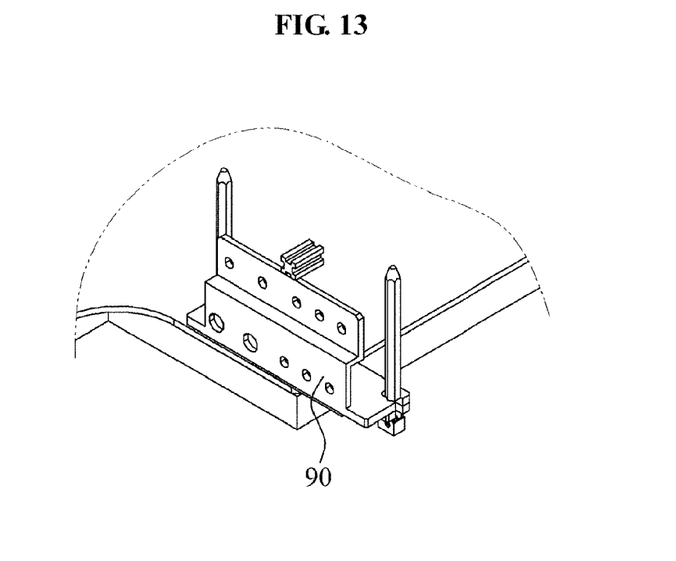
FIG. 13 is a perspective view of a terminal block module of the vol-oxidizer for spent nuclear fuel of FIG. 1.

FIG. 13 is a perspective view of the terminal block module 90 of the spent nuclear fuel vol-oxidizer 1.

Referring to FIGS. 1, 2, and 13, the terminal block module 90 may be mounted to the support board 51 of the support module 50. The terminal block module 90 is connected to an external power supply and to an electric wire of the spent nuclear fuel vol-oxidizer 1. The terminal block module 90 may be connected to the support board 51 by a fastening member. The terminal block module 90 may include a plurality of holes.

Figure 14:
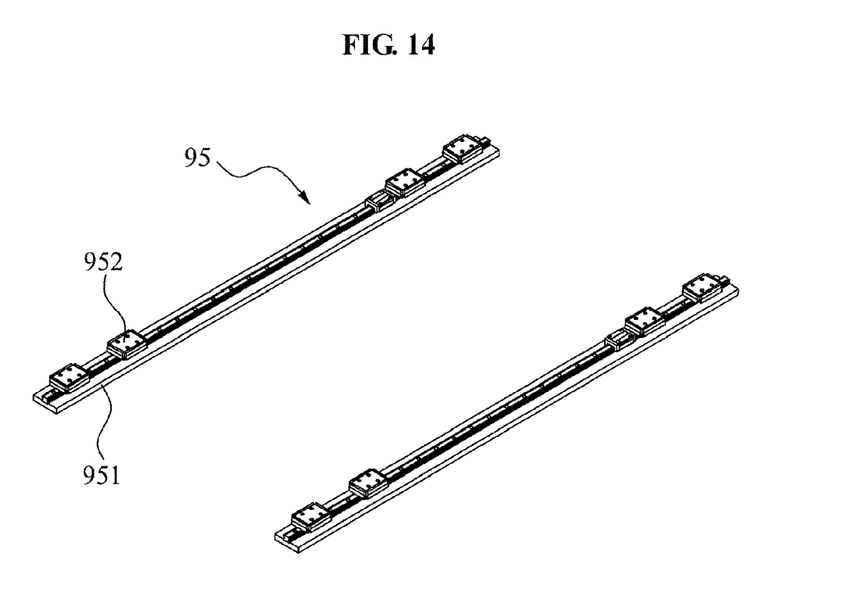
FIG. 14 is a perspective view of a guide module of the vol-oxidizer for spent nuclear fuel of FIG. 1.

FIG. 14 is a perspective view of the guide module 95 of the spent nuclear fuel vol-oxidizer 1.

Referring to FIGS. 1, 2, and 14, the guide module 95 may include a fixed unit 951 fixed to the support board 51, and a moving unit 952 connected to the fixed unit 951 to be movable linearly.

The fixed unit 951 may extend in a predetermined direction and may include a guide portion to guide movement of the moving unit 952. For example, the guide portion may be a groove formed on the fixed unit 951. The fixed unit 951 may be fixed to the support module 50 by the fastening member.

The moving unit 952 may be connected to bottom surfaces of the first heating body 11 and the second heating body 12 and moved integrally with the first heating body 11 and the second heating body 12. The moving unit 952 may be fixed to the first heating body 11 and the second heating body 12 by a fastening member. The movement of the moving unit 952 may be guided by the guide portion of the fixed unit 951.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A vol-oxidizer for spent nuclear fuel comprising:
   a reactor module in which the spent nuclear fuel is placed and oxidized;
   a heating module to heat the reactor module to a high temperature;
   a utility module to control an inner state of the reactor module, being connected with the reactor module;
   a support module to support the heating module and the reactor module;
   a drive module to supply a driving force for transferring the spent nuclear fuel within the reactor module;
   a valve module to control discharge of the spent nuclear fuel being oxidized in the reactor module; and
   a collecting container module to collect the spent nuclear fuel being oxidized and discharged from the reactor module,
   a guide module to guide movement of the heating module, wherein the respective modules are assembled and disassembled with respect to one another.

2. The vol-oxidizer of claim 1, wherein
   the heating module comprises a first heating body and a second heating body connectable to both sides of the reactor module, and
   the first heating body and the second heating body are mounted to the support module in a sliding manner.

3. The vol-oxidizer of claim 1, further comprising an air cylinder module connected to one side of the heating module to supply a force for separating and connecting the heating module.

4. The vol-oxidizer of claim 1, wherein the heating module comprises a handling tool connector to which a handling tool for transferring the heating module is connected.

5. The vol-oxidizer of claim 1, wherein the reactor module comprises:
   a body unit to mount an oxidation container adapted to receive the spent nuclear fuel; and
   an introduction unit to supply a path for introducing the spent nuclear fuel into the oxidation container from an outside.

6. The vol-oxidizer of claim 5, wherein the utility module comprises:
   a decompression unit to decompress the reactor module to a vacuum state so that the reactor module performs a high-temperature oxidization process under vacuum;
   a degassing unit to remove gas generated from the spent nuclear fuel during the high-temperature oxidization process;
   an oxidizing agent supply unit to supply a path for feeding of an oxidizing agent into the oxidation container; and
   an introduction unit cover to selectively open and close the introduction unit of the reactor module.

7. The vol-oxidizer of claim 1, wherein the drive module comprises:
   a rotation shaft configured to pass through the reactor module;
   a motor to supply a driving force to the rotation shaft;
   a power transmitter to transmit the driving force of the motor to the rotation shaft; and
   a transfer unit to transfer the spent nuclear fuel into the oxidation container.

8. The vol-oxidizer of claim 7, further comprising a motor housing to receive the motor,
   wherein the motor comprises a wheel unit configured to be connected with the motor housing in a sliding manner, and
   the motor housing is sloped down toward the rotation shaft.

9. The vol-oxidizer of claim 8, wherein the motor comprises a stopper to prevent the motor from sliding away from the motor housing by a predetermined distance.

10. The vol-oxidizer of claim 1, wherein the support module comprises:
- a base unit to constitute a bottom surface of the support module; and
- a main support unit configured to be rotatably connected to the base unit.

11. The vol-oxidizer of claim 1, wherein the heating module, the utility module, the drive module, the valve module, and the collecting container module are made of SUS304 and ceramic.

* * * * *